July 9, 1935.  E. H. CISCHKE  2,007,294

POWER DRIVEN SCAFFOLD

Filed Jan. 2, 1934

INVENTOR
Ernest H. Cischke.
BY
ATTORNEY

Patented July 9, 1935

2,007,294

UNITED STATES PATENT OFFICE 2,007,294

POWER DRIVEN SCAFFOLD

Ernest H. Cischke, Detroit, Mich.

Application January 2, 1934, Serial No. 704,923

1 Claim. (Cl. 304—18)

This invention relates to power driven scaffolds and the object of the invention is to provide a scaffold which may be driven up or down by means of an electric motor.

Another object of the invention is to provide a power driven scaffold having two drums about which the cables are wound and driven through a gear reduction from an electric motor, a rheostat being provided in the electric motor circuit for varying the speed of the electric motor.

A further object of the invention is to provide a power driven scaffold in which the gear reduction is so arranged as to hold the scaffold at any point when the electric motor is stopped.

Another object of the invention is to provide a power driven scaffold provided with a cable at each end wound about a drum, the drums being secured to a shaft which is driven by an electric motor through a gear reduction, the scaffold being provided with a frame at each end through which the cables extend to the respective drums.

These objects and the several novel features of the invention are hereinafter more fully described and claimed and the preferred form of construction by which these objects are attained is shown in the accompanying drawing in which—

Figure 1:
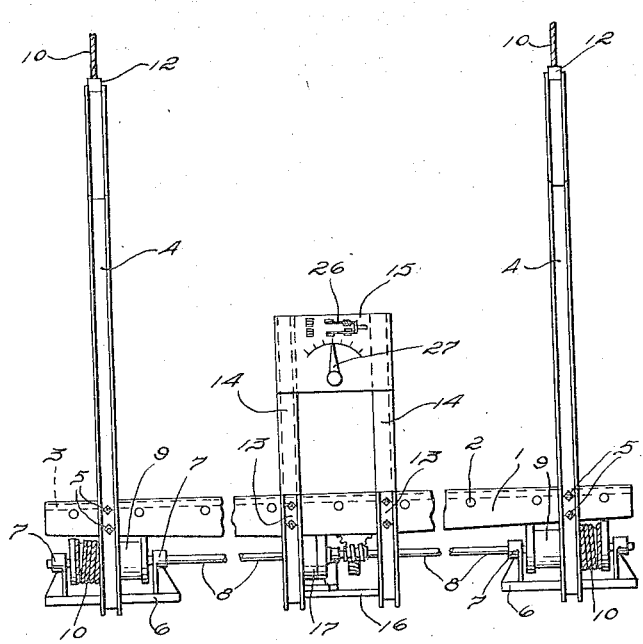
Figure 1 is a front elevation of a power driven scaffold embodying my invention.
Figure 2:
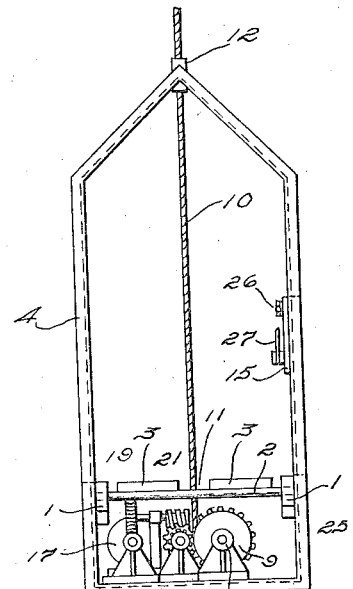
Fig. 2 is an end view thereof.
Figure 3:
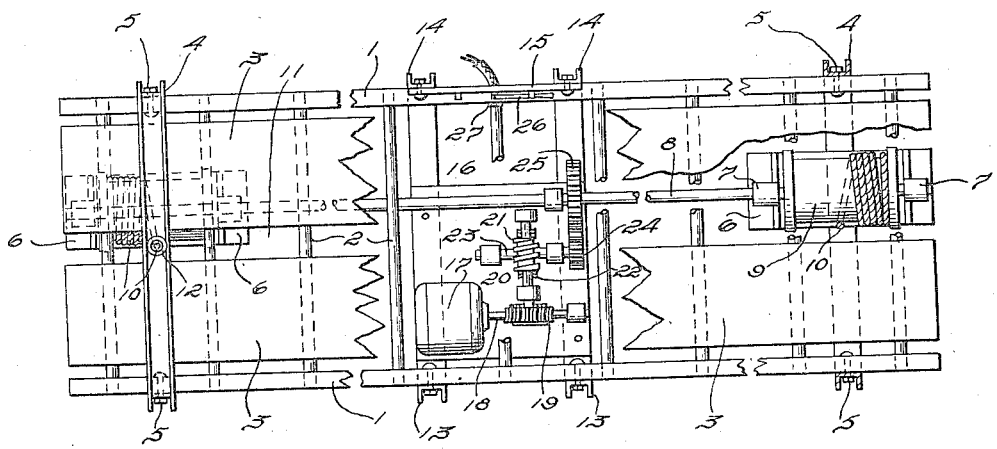
Fig. 3 is a plan view thereof.

As shown in Figs. 1, 2 and 3, the scaffold comprises two side frame members 1 having rungs 2 extending therebetween on which the floor boards 3 are supported. A frame 4 is provided at each end which is substantially rectangular in form and this frame 4 is secured to the frame members 1 by means of the bolts 5 shown in Fig. 1. By this arrangement the frames 1 and floor boards 3 are supported above the bottom of the end frame members. The frame members 4 are formed from channel iron and a support 6 is secured to the bottom of each frame 4 as shown in Fig. 1. Each support 6 is provided with a pair of bearings 7 for the shaft 8 and a drum 9 is secured to the shaft 8 at each end between the bearings 7. A cable 10 is secured to each drum 9 and extends upwardly through the space 11 between the floor boards 3 and through a guide 12 provided in the upper end of each frame 4. These cables 10 extend upwardly to cornice hooks or the upper ends of a pair of ladders or any other suitable support.

In order to drive the shaft 8, a pair of channel iron frame members 13 are secured to one frame member 1 and extend downwardly and across beneath the device and upwardly on the opposite side at 14 and support a panel 15 on the upper ends thereof.

A plate 16 is secured on the transverse portions of the frame members 13 beneath the scaffold and an electric motor 17 is mounted on this plate. This electric motor is provided with a shaft 18 having a worm thereon meshing with the worm gear 19 on the shaft 20.

The shaft 20 is provided with a worm 21 meshing with the worm gear 22 on the shaft 23 and the shaft 23 is provided with a gear 24 on the end thereof meshing with the gear 25 on the shaft 8. The shafts 18, 20 and 23 may be supported in bearings on the plate 16 but are preferably mounted in a housing for protection. This provides a gear reduction between the electric motor and the shaft 8 and by means of the worm gears the drive mechanism is locked at any point where the electric motor is stopped, as meshing of the worm gears with the worms prevents rotation of the shaft 8 in either direction except when the worm gears are driven by the electric motor.

The circuit for the electric motor is carried up to the panel 15 on which a double throw reversible switch 26 is provided. The electric motor 17 is a reversible motor and the switch 26 may be thrown to drive the motor in a forward direction or by throwing the switch over to the other side the motor may be driven in a reverse direction which is common practice with reversible motors and the circuit for which is not here shown. Between the switch 26 and the electric motor 17, a rheostat is preferably provided which is controlled by the pointer 27. This rheostat may be used for varying the speed of the electric motor, as is usual practice, to vary the speed of the scaffold in its upward or downward movements.

In operation the cables 10 are secured to their supports and the operator by throwing the switch 26 provides current to the motor to drive the scaffold upwardly. When the scaffold has reached the top of its movement where it is desired to start painting, for instance, the switch 26 may be thrown out to stop the motor and the painting may be started.

After the painting is started the switch 26 is thrown over to reverse the motor and lower the scaffold and the rheostat 27 is set to give the lowest motor speed. At this time the scaffold will gradually move downwardly and when spray painting is done the rheostat may be adjusted to give a downward movement of the scaffold in accordance with the speed with which the surface may be spray painted. The thimbles or guides 12 through which the cables move tend to steady the scaffold and the pull on the cables is in a vertical plane centrally of the scaffold. As the shaft 8 is a single shaft both drums are rotated at the same speed in a reverse or forward direction and thus the scaffold will remain level at any point in its travel.

From the foregoing description, it becomes evident that the device is very simple and efficient in operation, will not easily get out of order, may be handled by a single operator and provides a device which accomplishes the objects described.

Having thus fully described my invention, its utility and mode of operation, what I claim and desire to secure by Letters Patent of the United States is—

In a power driven scaffold, a pair of frame members each having parallel sides and a cross piece at the bottom, a scaffold extending between the frame members, the scaffold being secured to each frame member above the cross piece, a supporting bracket mounted on each cross piece beneath the scaffold, a shaft rotatably mounted in the supporting brackets, a drum on each end of the shaft, a cable secured to each drum and wound thereabout, a U-shaped frame secured to the scaffold between the end frame members and extending beneath the scaffold, a gear reduction mechanism mounted on said frame and operatively connected with the shaft, an electric motor mounted on said frame beneath the scaffold and arranged to drive the gear reduction mechanism, one end of the U-shaped frame extending above the scaffold and a rheostat mounted on said extending end and arranged for controlling the speed of the electric motor.

ERNEST H. CISCHKE.